(12) United States Patent
Skogman et al.

(10) Patent No.: US 10,346,278 B2
(45) Date of Patent: Jul. 9, 2019

(54) INVERSION DOMAIN MERGE BASED ON CELL STATISTICS

(71) Applicant: PGS GEOPHYSICAL AS, Oslo (NO)

(72) Inventors: Carl Joel Gustav Skogman, Jarfalla (SE); Lars Erik Magnus Bjornemo, Knivsta (SE)

(73) Assignee: PGS Geophysical AS, Oslo (NO)

( * ) Notice: Subject to any disclaimer, the term of this patent is extended or adjusted under 35 U.S.C. 154(b) by 1085 days.

(21) Appl. No.: 14/717,761

(22) Filed: May 20, 2015

(65) Prior Publication Data

US 2016/0239398 A1    Aug. 18, 2016

Related U.S. Application Data

(60) Provisional application No. 62/116,675, filed on Feb. 16, 2015.

(51) Int. Cl.
*G01V 3/08*     (2006.01)
*G06F 11/34*    (2006.01)

(52) U.S. Cl.
CPC ......... *G06F 11/3452* (2013.01); *G01V 3/083* (2013.01); *G01V 2003/086* (2013.01)

(58) Field of Classification Search
CPC . G01V 3/083; G01V 3/30; G01V 3/40; G01V 1/36; G01V 2003/086; G06F 11/3452
USPC .......... 702/14; 166/150.01; 367/24
See application file for complete search history.

(56) References Cited

U.S. PATENT DOCUMENTS

| | | | |
|---|---|---|---|
| 6,594,585 B1 * | 7/2003 | Gersztenkorn | G01V 1/30 702/14 |
| 8,126,650 B2 * | 2/2012 | Lu | G01V 3/083 166/250.01 |
| 9,410,421 B2 * | 8/2016 | Bradford | G01V 1/40 |
| 2013/0163378 A1 * | 6/2013 | Poole | G01V 1/36 367/24 |

* cited by examiner

*Primary Examiner* — Regis J Betsch
*Assistant Examiner* — Kaleria Knox
(74) *Attorney, Agent, or Firm* — Patterson + Sheridan LLP

(57) ABSTRACT

Methods of geophysical prospecting and surveying are disclosed herein. The methods include obtaining a raw data set representing energy signatures recorded over an area of the earth and using a computer to form a final data set representing the physical properties of the area of the earth, the process including combining physical property data subsets into a final data set using a quality statistic for each physical property data subset or each datum of each physical property data subset as a weighting factor to compute a weighted average.

10 Claims, 2 Drawing Sheets

INVERSION DOMAIN MERGE BASED ON CELL STATISTICS

CROSS-REFERENCE TO RELATED APPLICATIONS

This application claims benefit of U.S. Provisional Patent Application Ser. No. 62/116,675, filed Feb. 16, 2015, entitled "Inversion Domain Merge Based on Cell Statistics", which is incorporated herein by reference.

BACKGROUND

Certain aspects of the present disclosure generally relate to the field of geophysical surveying and may have particular applicability to electromagnetic (EM) surveying in marine or other settings.

In geophysical prospecting in a marine environment, sources and receivers are used to understand the geography of the earth below the water. In a particular surveying method, sources of electromagnetic radiation or fields are deployed according to a desired arrangement to direct electromagnetic radiation toward the earth. The radiation interacts with structures and materials in the earth, and the interaction changes the radiation according to properties of the structures and materials. The changed radiation is detected by receivers, which record data representing the changed radiation. The data is then analyzed to understand the properties of the earth. The electromagnetic radiation may take the form of a wavefield that propagates through the water and into the earth. The changed radiation also typically propagates as a wavefield. The sources and receivers may be stand-alone devices, or may be arranged in elongated assemblies. The assemblies may be towed behind a vessel, or may be stationary in the water or on the sea floor. In some cases, receiver assemblies are referred to as "streamers".

In order to understand properties of the materials and structures in the earth, a model is typically used to derive the properties from the recorded data. In the case of electromagnetic surveying, the recorded data are typically voltages, and these voltages, related to characteristics of the source radiation and the geometry of the source and receiver arrangement, indicate the transformation of the radiation by the structures and materials in the earth. The transformation, in turn, indicates physical properties of the materials such as resistivity, magnetic permeability, density, and other physical properties. Using a physical model that relates such physical properties to transformations in electromagnetic radiation, the physical parameters can be iteratively determined by computing results from the model based on a representation of the known source radiation, the geometry of the survey, and estimates of the physical properties. Agreement of the model results with the detected radiation indicates the accuracy of the estimate, and if such accuracy is inadequate, the estimate is refined until a desired accuracy is reached. This process is typically called inversion. The sub-process of calculating model results, as part of the inversion process, is typically referred to as "forward modeling".

In a typical geophysical surveying process employing inversion, a large amount of data is collected over a wide geographical area. For purposes of inverting the data, the volume under the surveyed geographical area is represented as a "grid" or matrix of "cells", each representing a small volume of the surveyed area. Each cell may be modeled as having uniform physical properties, so that one value of a physical property applies to the entire cell. The physical property is estimated, and the forward model is computed to give an estimate of the recorded data. The estimate is compared to the recorded data, and the quality of the fit is judged and compared to one or more criteria. If the quality of the fit is insufficient, the estimate of the physical property of each cell is adjusted, and the forward model recomputed. This iterative process continues until the fit criteria are met, at which point the inversion is said to have "converged".

Various methods of converging inversion problems are typically used. The estimates may be refined using various types of Monte Carlo methods, linearized neighborhood approximations, Gauss-Newton search methods, and the like. Such methods typically require vast computing resources, and even then may be unacceptably slow.

Therefore, techniques for geophysical inversion that reduce computational time and resource requirements are needed.

BRIEF DESCRIPTION OF THE DRAWINGS

So that the manner in which the features of the present disclosure can be understood in detail, a description of the disclosure may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

It is to be understood the present disclosure is not limited to particular devices or methods, which may, of course, vary. It is also to be understood that the terminology used herein is for the purpose of describing particular aspects only, and is not intended to be limiting. As used herein, the singular forms "a", "an", and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." Terms such as "coupled", "coupling", and "couplable" refer to being directly or indirectly connected.

This disclosure may have applications in marine surveying, in which one or more energy sources are used to generate wavefields, and sensors—either towed or ocean bottom—receive energy generated by the sources and affected by the interaction with the subsurface formation. Likewise, this disclosure may have applications in marine electromagnetic (EM) surveying, in which one or more EM field sources are used to generate EM fields, and EM sensors—either towed or ocean bottom—receive EM energy generated by the EM sources and affected by the interaction with the subsurface formations.

Figure 1:
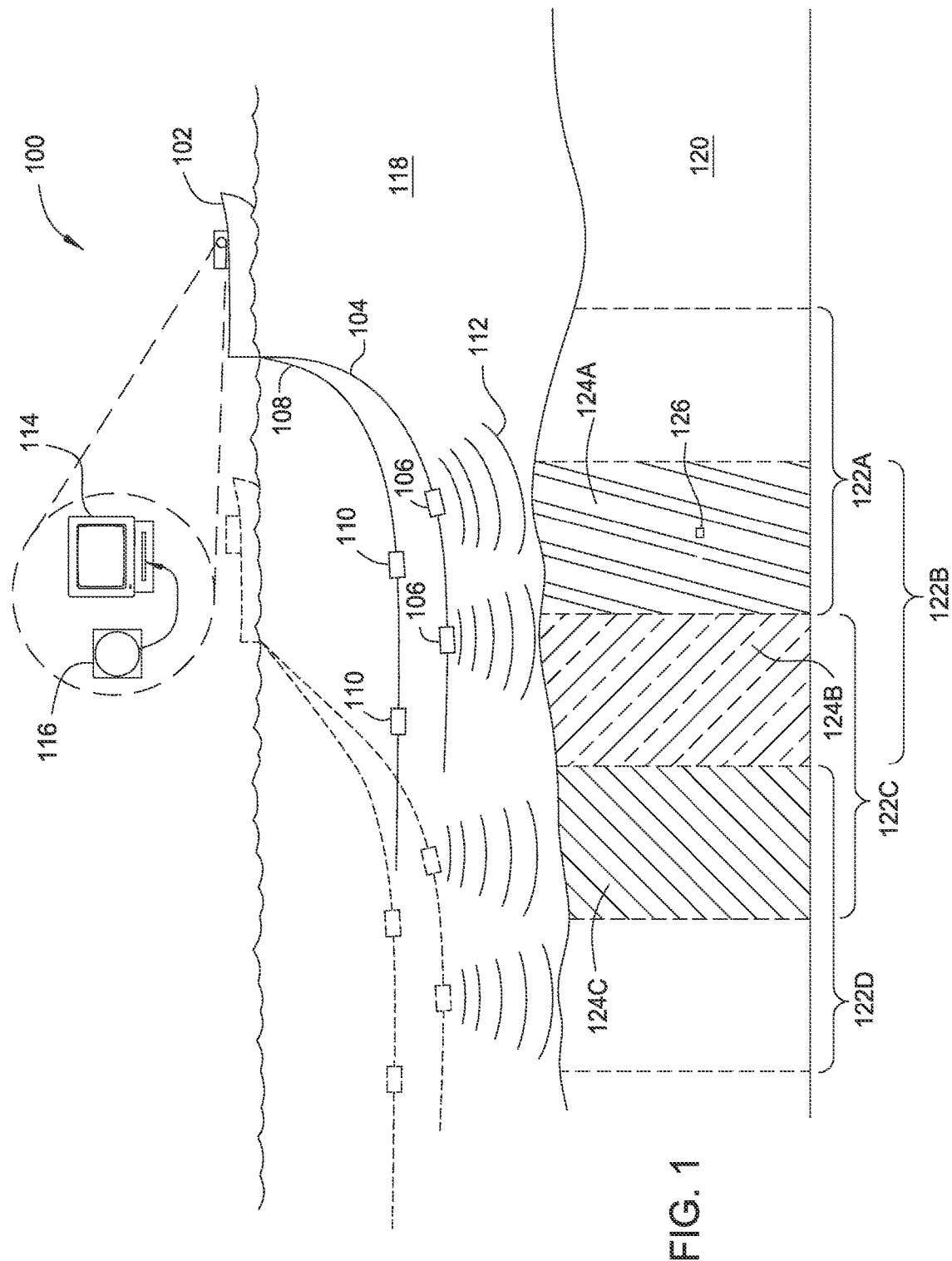
FIG. 1 is an example activity diagram showing a data acquisition scheme in a marine context.

FIG. 1 is an example activity diagram showing a data acquisition scheme 100 in a marine context. The data acquisition scheme 100 is one way to collect geophysical data for use in an inversion process to determine structures and materials of the earth below the water. A vessel 102 tows one or more source assemblies 104, each having one or more energy sources 106, and one or more receiver assemblies 108, each having one or more receivers 110. In alternate configurations, one or more of the source assemblies 104 and/or the receiver assemblies 108 may be stationary in the water or on the sea floor.

An electromagnetic (EM) source may have pairs of spaced apart electrodes which are energized by electric current to produce an electric field, which may be an electromagnetic wavefield in some embodiments, for example where the electric current applied to the electrodes is caused to vary in some way. An electromagnetic source may also be a loop through which an electric current is passed to induce a magnetic field, which may also be an electromagnetic wavefield if the electric current is caused to vary. A receiver used for EM surveying may include one or more spaced apart pairs of electrodes, where each pair of electrodes may be coupled across the input terminals of a proximately positioned signal amplifier. An EM receiver may also include a loop in which a detected magnetic field may induce an electric current. An EM receiver assembly may also include signal digitization and electrical to optical signal conversion devices (not shown separately in FIG. 1). Optical transmission is sometimes used instead of electrical transmission to avoid generating unwanted electromagnetic fields from the transmissions. Such sources and receivers may be used in any desired combination or arrangement. Where this disclosure refers to "sources" and "receivers", it is to be understood that the methods described herein are equally applicable to embodiments with only one source or only one receiver, and vice versa.

If EM sources are used in the configuration shown in FIG. 1, the electromagnetic fields emitted by the sources may induce horizontal dipole electric fields, vertical dipole electric fields, horizontal magnetic fields, and/or vertical magnetic fields in the subsurface. The fields may be constant or varying, and may include electric, magnetic, and electromagnetic wavefields.

In the marine context, the source 106 emits energy 112 that propagates through the water and may interact with various surfaces of water 118 and earth 120 to produce an energy signature. The one or more receivers 110 may detect the energy signature, and may record the energy signature as data, for example voltages. The data collected from the one or more receivers 110, depicting real-world energy signatures from the physical environment, forms a primary record of the energy signatures that may be represented and stored in a computer 114 or on a computer readable medium 116 that may be inserted into, or otherwise connected to, the computer 114 for storing the data. The computer readable medium 116, which is not a transitory signal medium, may contain the raw data collected from one or more receivers 110 or a data product made by processing the raw data. Computer readable media that may store various aspects include rotationally operated magnetoresistive memory devices such as floppy disks, hard disks, stationary magnetoresistive memory devices such as flash drives, and optical disks.

In a typical geophysical survey process, the source and/or receiver assemblies 104, 108 may be towed by the vessel 102 at a selected velocity. The sources 106 may be energized at selected times to provide energy impulses at different locations along the tow line. The receivers 108 record data for each energy impulse over a geographic area, so that each energy impulse is recorded over a certain geographic domain. This disclosure relates to methods of inverting the data recorded by the receivers 108 into a representation of the physical properties of the earth in the surveyed area.

In FIG. 1 the vessel 102, with source and receiver assemblies 104, 108 are shown in phantom at a position earlier in time. At the two positions shown in FIG. 1, the energy sources 106 have emitted four energy fields or impulses 112 toward four different areas—a first area 122A, a second area 122B, a third area 122C, and a fourth area 122D of the earth 120. The areas 122A, 122B, 122C, and 122D may overlap.

Each energy emission from each source generates a response from the earth that is recorded by the receivers as a response data set. Each response data set is defined over a subdomain, and represents the energy field in a certain geographic area, such as one of the areas 122A, 122B, 122C, 122D corresponding to the subdomain of the response data set. Each subdomain is a subset of the overall survey domain, which represents the complete geographic area under survey. The boundaries of each subdomain may be defined by distance from the source, distance from the receivers, sensitivity, or another parameter. The response data sets representing the energy field returned from the first area 122A and the second area 122B each have a portion of their domain where they overlap, the overlapping domain representing a first overlap area 124A. A second overlap area 124B and a third overlap area 124C, in the scenario depicted in FIG. 1, are also represented in overlapping domains of response data sets. The data from two data sets in overlapping domains are typically combined to form a survey data set defined on a larger domain, which may represent the entire geographic area covered by the survey, or a portion thereof. In many cases, several subdomains may be combined.

Each subdomain (representing the areas 122A, 122B, 122C, and 122D), and the survey domain, may be dimensioned on three physical dimensions, and as is typical with inversion problems, each subdomain, and the survey domain, are defined as a matrix of cells, each cell having a unique address in the subdomain or survey domain. Each cell represents a specific location 126 in the area of the geographic survey. Because subdomains may overlap, a cell in one subdomain may represent the same location 126 as a cell in a second subdomain and a cell in the survey domain. When the response data sets are combined, cells in overlapping portions of the first subdomain and the second subdomain may have different values in their respective response data sets. For example, the value of the cell representing the location 126 in the response data set representing the energy field returned from the first area 122A may be different from the value of the cell representing the location 126 in the response data set representing the energy field returned from the second area 122B.

When inversion is performed, computing resources and time to converge the inversion depends on, among other things, the size of the data set being inverted. Inverting the data sets of the subdomains individually may take less time and computing resources than inverting the entire survey data set. In such problems, each data set may be inverted to form an inversion data set for each subdomain, and then the inversion data sets may be combined to form a survey inverted data set. As noted above, each cell of each subdomain may have different values in different inversion data sets. This disclosure describes statistical methods of combining the individual inversion data sets according to various measures of quality and/or accuracy of the individual inversion data sets.

In such a scenario, a raw data set d is recorded that represents energy signatures recorded over a domain Ω for an area of the earth O. Inversion seeks to model the physical response of the area O having physical properties m to energy perturbations based on estimates of the physical properties m selected to reproduce the raw data set d as closely as possible. The raw data set d may be a zero-rank quantity, for instance a scalar quantity, or a higher-rank quantity, such as a vector or tensor, and is dimensioned over a location variable x, which is typically a 3-vector, but may be any desired dimensionality. In this specification, bold face type represents non-scalar quantities. The location variable x typically covers the domain Ω. The set m of physical properties may also be a scalar or non-scalar quantity, for example if more than one physical property is being estimated from the raw data set d. In the general case, the raw data set is a vector or tensor d(x), and the physical properties set is a vector or tensor m(x).

The physical properties m are related to the raw data set d by some theoretical function:

$$d = f(m),$$

which is usually an algebraic function, and which may be linear or non-linear. From this function, an estimate $\underline{d}$ of the data set d may be computed from an estimate $\underline{m}$ of the physical properties m. The error may then be computed as $e(x) = d(x) - \underline{d}(x)$. Error may be defined as a vector in this case to account for collecting more than one type of data in a survey, so that a vector model f generates a data estimate vector $\underline{d}(x)$. In a typical inversion process, successive physical property estimates $\underline{m}_i$ are computed or otherwise defined, optionally as a function of the error e or some other parameter, successive estimated data sets $\underline{d}_i$ are computed, and successive errors $e_i$ are derived. In some embodiments, the inversion is said to converge when an error $e_i$ reaches some threshold or criterion.

When N data subsets $d_j$, j=1 to N, are defined, each may be inverted to an estimated physical property subset $\underline{m}_j$, properly converged as described above. Each of the N data subsets $d_j$ may be one of the response data sets collected in response to an energy perturbation, or each subset $d_j$ may be a combination of more than one such response data sets, such as an average, which may be a weighted average. Each estimate subset $\underline{d}_j$ has a domain that may be a subdomain of the overall domain Ω. If some of the data subsets $d_i$ have overlapping domain, such as in the scenario described above in connection with FIG. 1, then there are M data subsets that are defined at a particular location $x_0$. If, at the location $x_0$, the converged overlapping estimated physical property subsets are defined as $\underline{m}_k$, k=1 to M, such that the converged estimated physical property subsets $\underline{m}_j$, j=M+1 to N, are not overlapping, then the converged estimated physical property data points $\underline{m}_k(x_0)$ are M different converged estimates of the physical properties at location $x_0$, resulting from inversion of the data subsets $d_k$, k=1 to M. In some cases, N=M and all the data subsets overlap a particular location. In most cases, M<N.

The data subsets $d_j$ may be properly formed as separate sets of data in the inversion process, or the data subsets $d_j$ may be defined within the combined data set d using pointers, addresses, domain keys, or any convenient method. In most cases, the estimates $\underline{d}$ and m, and subsets thereof, are handled, defined, and maintained the same way as the data set d and subsets $d_j$ to simplify processing, but such matched structures are not necessary to practice the methods described herein.

The $\underline{m}_k(x_0)$ data points may be combined into an overall estimate of the physical properties at $x_0$ using a statistical treatment of the converged physical property estimates $\underline{m}_k(x_0)$, such as a weighted average, where the weighting is a quality statistic based on a measure of the quality of the estimates $\underline{m}_k(x_0)$. The data used to determine the quality of each of the estimates $\underline{m}_k(x_0)$ may be derived from different source-receiver pairs, so the data may have more or less noise, sensitivity, or other variation factors, that tend to influence the inversion. The general combination at the location $x_0$ is given by $$\underline{M}(x_0) = \varphi(\Sigma_k \underline{m}_k \circ w_k, \Sigma_k) \quad (1)$$

where the function $\varphi(A,B)$ is the array, or element-by-element, quotient and the "o" operator denotes element-by-element multiplication, also known as the array product or Hadamard Product. $\underline{M}(x_0)$ is the statistically combined estimate of the physical properties at location $x_0$. The combined estimates are typically computed across the set of locations χ where the domains of the data sets d(x) overlap, so $\underline{M}(\chi)$ is the converged inverted combined estimate of the physical properties at the locations χ. These physical properties may be combined with inverted physical properties determined for locations in the survey domain ω where the domains of the data sets d(x) do not overlap to yield physical properties across the entire survey domain Ω.

Weighting factors that may be used for the above process include sensitivity metrics, uncertainty metrics, error metrics, or combinations thereof. Sensitivity metrics generally include quantities that represent the sensitivity of the estimated data $\underline{d}$ or the error e to changes in the estimated physical properties $\underline{m}$. For example, sensitivity of the error e to change in the estimated physical properties $\underline{m}$ may be computed using the last adjustment made to the estimated physical properties to achieve convergence. For a given data set $d_j$, iterative estimates of physical properties $\underline{m}_{j,i}$ are made, from which estimated data are computed $\underline{d}_{j,i} = f(\underline{m}_{j,i})$ and the resulting error is computed $e_{j,i} = \underline{d}_{j,i} - d_{j,i}$. If P total iterations are required for convergence, such that $e_{j,P} \leq c$, where c is a non-scalar convergence criterion (it should be noted that convergence may also be defined in terms of a function of the errors, or any other desired parameter), then sensitivity of the error may be defined as follows:

$$s_j = \varphi(\epsilon_j, \mu_j)$$

$$\epsilon_j = e_{j,P} - e_{j,P-1}$$

$$\mu_j = \underline{m}_{j,P} - \underline{m}_{j,P-1}$$

Alternately, $\mu_j$ may be defined as a tensor that is the set of characteristics, for example principal minors, of the tensor $\{\underline{m}_{j,P}, \underline{m}_{j,P-1}\}$. In this definition of sensitivity, the domain of the sensitivity is location, so for a given physical property, sensitivity is a scalar at each location. Using sensitivity $s_j$ as the weighting factor, a final combined and converged inverted physical property set $\underline{M}(x_0)$ may be computed from each of the individual data sets $\underline{m}_k(x_0)$ by substituting $s_k$ for $w_k$ in equation 1 as follows:

$$\underline{M}(x_0) = \beta(\Sigma_k \underline{m}_k \circ s_k, \Sigma_k s_k).$$

Sensitivity may also be defined in terms of the derivative of the model d=f(m). For a linear model, d=Am, where A is a coefficient tensor that represents the theoretical dependence of d on m, sensitivity is identical to the tensor A. For a non-linear model, sensitivity may be defined as the Jacobian tensor J=∂d/∂m, or as the coefficient tensor of a linearized version of the model (if Taylor linearization is used, such coefficient tensor is identical to the Jacobian tensor). In this definition of sensitivity, the domain of sensitivity is two locations, such that the sensitivity at each location has some dependence on the physical property estimates at all locations. In such models, sensitivity usually falls with distance from the target location, because the physical response at a location to an energy perturbation does not depend strongly on the physical properties at a distant location. In such models, the sensitivity may be reduced to the location domain, for example by tensor contraction, to be used as weighting factors for the location-based physical property estimate subsets $\underline{m}_k$. Or, the sensitivity tensor may be dimensioned on a neighborhood of the target location.

The weighting factor may also be a function of the uncertainty in the physical property estimates $\underline{m}_k$. The uncertainty may be expressed as the variance $\sigma^2$. Variances in $\underline{m}_k$ may be found on the diagonal of the covariance matrix for the physical properties:

$$\sigma^2_k = \text{diag}(R(\underline{m}_k(x)))$$

According to this definition of variance, each data set $\underline{m}_k(x)$ has a single variance vector $\sigma^2_k$ with a value for each physical property. Alternately, at each location $x_0$, the variance $\sigma^2_k$ may be defined for each of the converged physical property estimates $\underline{m}_k(x_0)$ as $\sigma^2_k(x_0) = (\underline{m}_k(x_0) - \hat{m}_k)^2$, where $\hat{m}_k$ is the average value of a physical property in data set $\underline{m}_k$, corresponding to the inversion of data set $d_k$. If we define a uniformity metric as a vector or tensor $$u_k(x_0) = \left\{ \frac{1}{\sigma^2_1}, \frac{1}{\sigma^2_2}, \ldots \frac{1}{\sigma^2_M} \right\}$$

being the set of reciprocal variances $$\frac{1}{\sigma^2}$$

for each of the M physical property estimates $\underline{m}_k$ at location $x_0$, we can set $w_k = u_k$ in equation 1 above, and use the reciprocal variances as a weighting factor for the physical property estimates. The uniformity metric above is defined on the basis of one physical property of $\underline{m}_k$, where the variances are scalar quantities, but the rank of the uniformity metric may be raised to include the dimensionality of multiple physical properties in $\underline{m}_k$, if desired. In another embodiment, the variances may also be normalized by sensitivity before forming the uniformity metric. If a sensitivity is used that depends only on location, the M variances may be normalized by the scalar sensitivity (for each type of data recorded) at each location. If sensitivity defined by two locations is used, a characteristic g of the sensitivity tensor at location $x_0$ may be generated (one for each type of data recorded, so the characteristic may be a vector g), and the variance normalized to the characteristic value g. Standard tensor invariants may be used, such as trace, sum of principal minors, or product of eigenvalues, or the tensor may be contracted to a discriminant. In any of the foregoing ways, a measure of the uncertainty in inversion results may be used to combine inversion results in overlapping domains to improve the quality of the overall inversion result and reduce computational resources and time needed to achieve the result.

The result of the above process is a final data set, which is the combination, for example the sum or union, of the final combined physical properties data set $\underline{M}(x_0)$ and any inverted data subsets $\underline{m}_j$, $j=M+1$ to N, that do not have domains overlapping any other subset. The final data set typically has a domain that is essentially congruent with the domain $\Omega$.

The M estimates of a physical property at $x_0$, $\underline{m}_k(x_0)$, $k=1$ to M, also have a variance $$\sigma^2_M(x_0) = \sum_{k=1}^{M} \frac{(\underline{m}_k(x_0) - \underline{M}(x_0))^2}{M}$$

that represents the uncertainty in the final combined physical properties $\underline{M}(x_0)$ at each location $x_0$. Thus, the variance $\sigma^2_M$ may be used to define a confidence level in the final combined physical properties $\underline{M}(x)$, or a range in which each of the values is most likely found (e.g. $\underline{M}(x) \pm 3\sigma_m(x)$ would theoretically cover 99.7% of the statistical population of a physical property), and may be included in a data product that includes the final combined physical properties $\underline{M}(x)$. The variance $\sigma^2_M(x)$ may also be used to define an uncertainty tolerance which, if not met, might prompt further inversion iteration of the entire data set, following initial inversion and combination, or further inversion of the data sets $d_j$ to improve convergence.

The variance $\sigma^2_M$ is one measure of uncertainty in the final combined physical properties $\underline{M}(x_0)$, but other measures may be used. For example, a weighted variance v may be computed, as follows:

$$v_M(x) = \sum_{k=1}^{M} \frac{q_k(\underline{m}_k(x) - \underline{M}(x))^2}{MQ}$$

where $Q = \Sigma q_k$. In this case, the same weighting factor $q_k$ is applied to each physical property in $\underline{m}_k(x)$ and $\underline{M}(x)$, but the approach may be readily extended to distinguish all the physical properties. As with the weighting factors described above, the weighting factors $q_k$ may be based on any convenient feature or parameter, such as noise, sensitivity, and the like.

Figure 2:
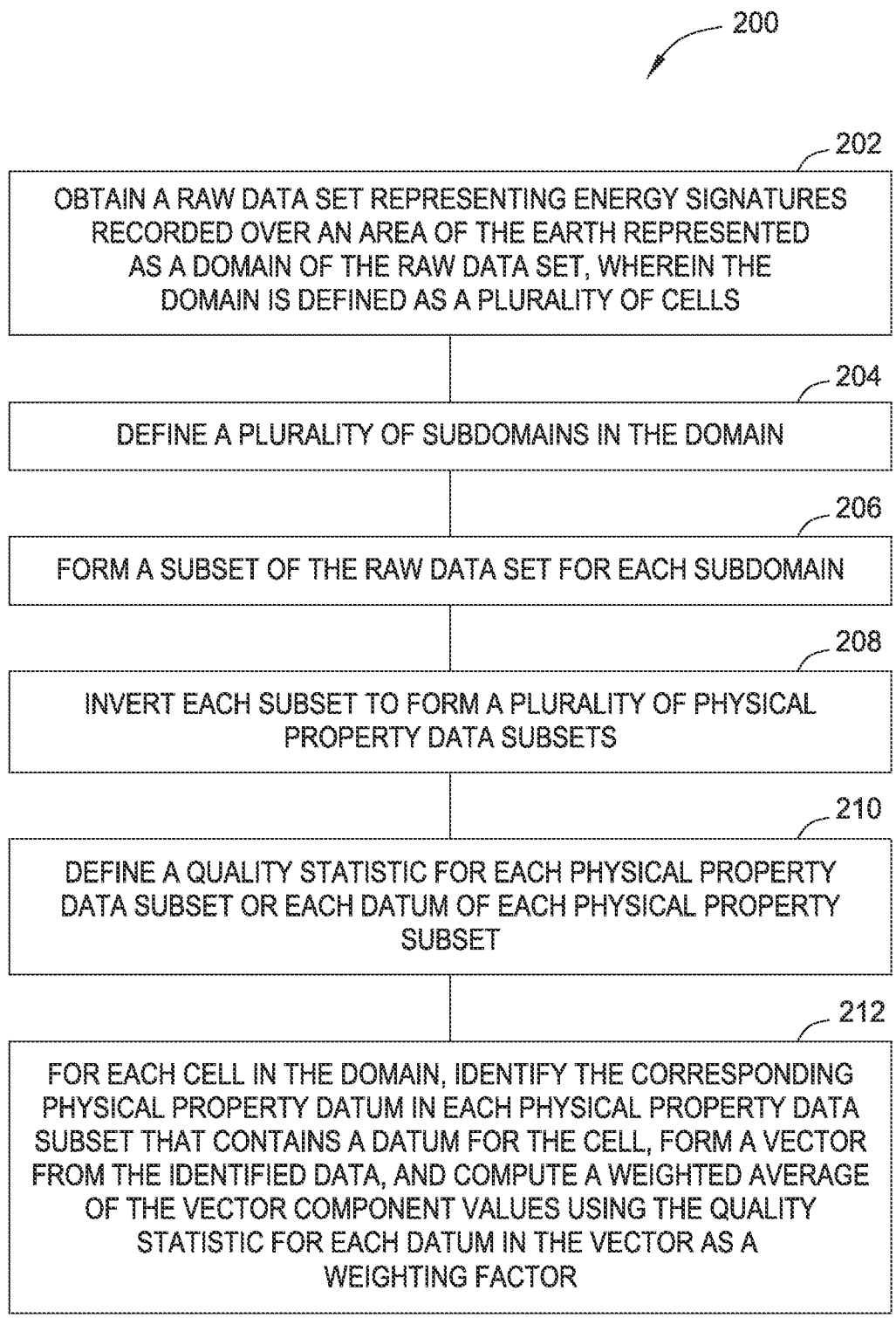
FIG. 2 is a flowchart summarizing a method according to one embodiment.

FIG. 2 is a flow diagram summarizing a method 200 according to one embodiment. The method 200 is a method of geophysical surveying, including obtaining a raw data set representing energy signatures recorded over an area of the earth represented as a domain of the raw data set, wherein the domain is defined as a plurality of cells; defining a plurality of subdomains of the domain; and forming a subset of the raw data set for each subdomain. Each subset is then inverted to form a plurality of physical property data sets; and the physical property data sets are combined into a final data set over the domain representing the physical properties of the area of the earth. The combination process includes defining a quality statistic for each physical property data set or each datum of each physical property data set. For each cell in the domain, the corresponding physical property datum in each physical property data set that contains a datum for the cell is identified to define a vector. A weighted average of the data in the vector is determined using the quality statistic for each datum in the vector as a weighting factor.

At 202, a raw data set d is obtained. The data set d is a collection of readings from a geophysical survey over a domain Ω representing the geographic region O of the survey. Energy is emitted toward an area of the earth, for example from an electric field emitter submerged in water and powered to emit an electric field or electromagnetic field. The data set d may contain a single type of data, for example voltage, or the data set d may contain more than one type of data, for example voltage and current. As noted above in connection with FIG. 1, the data set represents an energy field of the geographic region O resulting from energy emissions by one or more energy sources and a response from the earth to the energy emissions. The data set d may be collected using the scenario of FIG. 1, or any other suitable scenario. The data set d may be obtained by performing a data collection process at the geographic region O, or the data set d may be obtained by electronic means or by receiving a physical medium such as the computer readable medium 116 having the data set d stored thereon. In any event the data set d is typically entered into a computer, for example by installing, copying, or otherwise transferring the data set d into the computer for further processing due to the size and complexity of a typical data set obtained from a geophysical survey.

The data set d may have the domain Ω, which is defined by physical dimensions. The data set d may be derived from raw data collected over one or more physical dimensions and a time dimension. In a typical geophysical survey, time may be related to a physical position according to a known relation, so the raw data may be transformed by the known relation to remove the time dimension. The data set d may additionally be dimensioned on an ordinal representing instances of response data sets that make up the data set d. At 204, a plurality of subdomains is defined from the domain Ω. The subdomains may be defined by the instance number, j=1 to N, so that the subdomains correspond to the domains of the response data sets within the data set d. At least a portion of the subdomains usually have overlap, as described above in connection with FIG. 1. A computer may be used to perform the operation 204. A computer is usually used to perform operations 206-212, described below, due to the quantity of data involved in most geophysical surveys.

At 206, a subset $d_j$ of the data set d may be formed for each subdomain j defined above. Each subset may correspond to one of the response data sets that make up the data set d, or each subset may be a combination, such as an average or weighted average, of more than one such response data set. In many cases, each subset is offset in one or more physical dimensions from every other subset. For example, if the survey apparatus (vessel source assemblies, receiver assemblies) moves at a velocity, and a source emits energy at different times, the raw data sets recorded in connection with each energy emission will be offset in time, and that offset can be transformed to an offset in physical location, which can be applied to the raw data sets to remove the time dimension and form the response data sets. The response data sets can then be compiled into the data set d with an instance key for each response data set. The subsets $d_j$ can then be formed from the data set d as described above.

As noted above, instead of forming subsets $d_j$ as separate data sets, parameters may be used to define subsets $d_j$ for processing within the data set d, if desired. Forming separate subsets $d_j$ is not necessary to practice the methods described herein.

At 208, each subset $d_j$ is inverted to form a plurality of physical property data subsets $\underline{m}_j$. As described above, an estimate is made regarding the relevant physical properties of each cell within each subdomain, a model is applied to form a model estimate of the data in the subset, and the model estimate is compared to the data in the subset to determine the error in the model estimate, as described above. The physical property estimate is then refined, and the results computed, in an iterative fashion until a convergence criterion is met. The convergence criterion may be the magnitude of any individual cell error or some compilation or statistic of the cell errors, such as an average or sum. The convergence criterion may also be a magnitude of the change in the physical property estimate or the error, or some compilation, combination, or statistic thereof. For example, the degree of convergence may be computed using a linear or non-linear expression based on any or all of the errors for the model estimates, the magnitudes of the model estimates, the magnitude of change of the model estimates and/or the physical property estimates, the magnitude of change of the errors, and any other suitable parameters. Distance of the cell from the source and sensitivity of the estimate to changes in the physical property estimates may also be used along with the above parameters.

When the convergence criterion is satisfied, the last physical property estimate becomes a physical property data subset that represents the physical properties of the cells corresponding to the subdomain of the subset of the data set d that is the subject of the inversion. When each subset $d_j$ has been inverted, a plurality of physical property data subsets $\underline{m}_j$ is obtained, each physical property data subset representing the physical properties of a portion of the earth, represented as cells and corresponding to the subdomain of a subset of the data set d. Physical properties such as resistivity, density, polarity, and other chemical and electrical properties, can be determined.

As noted above, if the physical property data subsets have overlapping domains, cells appearing in multiple physical property data subsets may have different physical property values in the different physical property data subsets. The value $\underline{m}_k$ from each physical property data subset k for a given cell $x_0$ represents one estimate of the physical properties of that cell, and the collection of estimates represents a statistical sampling of the distribution of physical properties of the cell. The collection of estimates may be combined according to statistically valid procedures to obtain a best value for the physical properties of the cell. The estimates $\underline{m}_k(x_0)$ for each cell $x_0$ may be collected into a vector, or matrix if more than one physical property is represented, to streamline processing, if desired. The vector contains the corresponding physical property datum in each physical property data subset that contains a datum for the cell.

At 210, a quality statistic is defined for use in statistically combining the physical property data subsets $\underline{m}_k(x_0)$ in overlapping areas to form a final data set over the domain Ω. The quality statistic may be any statistic derived from the original data set d, the physical property data subsets, the errors computed at convergence of each inversion, the model, the geometry of the survey, or any combination thereof. The quality statistic may be selected from the group consisting of a sensitivity metric, an uncertainty metric, an error metric, a noise metric, or a combination thereof. In one instance, the quality statistic may be a variance of the errors associated with one or each physical property data subset or a variance of the physical property data in one or each physical property data subset. For example, the variance may be the variance of the final change in estimated physical property values for each inversion, or the variance of the data in the vector of physical properties for each cell. In another instance, the quality statistic may be the errors themselves, or the errors normalized by sensitivity, as described above, where sensitivity may be a function of one location or all locations in the domain. The quality statistic may also be an envelope of noise energy in the data set d or the subsets $d_j$, or an average or weighted average thereof. The quality statistic may thus be defined for each physical property data subset $\underline{m}_k$ or for each datum of each physical property data subset.

At 212, each cell of the overlapping domains, corresponding to a location $x_0$ of the domain $\Omega$, is considered. In each cell, estimates of the value of the physical properties in that cell are represented by the physical property data subsets $\underline{m}_k(x_0)$. For each cell in the overall domain $\Omega$, the corresponding physical property datum in each corresponding physical property data subset $\underline{m}_k$ is identified, if such datum exists. A vector may be formed from the identified data. A weighted average of the vector components, if a vector is formed, or of the identified data is determined using the quality statistic for each datum as a weighting factor. Equation 1 provides a general non-scalar expression of the computation, which may be reduced to a scalar version, if desired. As noted above the quality statistic may be a single value for each subset $\underline{m}_k$ or may vary by location within each subset $\underline{m}_k$. In any event, each datum will have a corresponding value of the quality statistic.

As noted above, the variance $\sigma^2_M(x)$, or other measure of uncertainty in the final physical properties, may also be computed, and may be used to define a confidence level of the final physical properties, to define a range within which the true value of the physical properties is most likely to be found, and/or to define an uncertainty tolerance that may be used to trigger further convergence by repeating operations 208, 210, and 212 above, continuing with the last estimates of physical properties prior to combination at 212. For example, the method 200 may be followed to complete a first inversion according to a first convergence criterion, and if a measure of uncertainty in the final physical properties resulting from the first inversion is unsatisfactory for any reason, a second convergence criterion may be defined, and the operations 208, 210, and 212 may be repeated according to the second convergence criterion to achieve an improvement in the overall result.

A data product may be formed using the method 200. The data product may contain any or all of the raw data set d, the final combined physical properties $\underline{M}(x)$, any or all of the various measures of uncertainty described herein, confidence ranges of the physical properties, computer code for performing the method 200 or any parts thereof, and computer code for analyzing or visualizing the physical properties. The data product may be stored on a computer readable medium, such as the computer readable medium 116, or the data product may be transmitted through wires or wirelessly to or from a computing or communications device.

While the foregoing is directed to aspects of the present disclosure, other and further aspects of the disclosure may be devised without departing from the basic scope thereof, and the scope thereof is determined by the claims that follow.

What is claimed is:

1. A method of geophysical prospecting, comprising:
   emitting energy toward an area of the earth;
   recording energy signature responses to the emitted energy from the area of the earth in a raw data set dimensioned over a domain representing the area of the earth, wherein the domain is defined as a plurality of cells;
   entering the raw data set into a computer; and
   using the computer to perform a process to form a final data set representing the physical properties of the area of the earth, the process comprising:
      defining a plurality of geographic areas in the area of the earth, the geographic areas possibly overlapping;
      defining a plurality of subsets of the raw data set, each representing an energy field from one of the geographic areas;
      defining a plurality of subdomains of the domain, each representing one of the geographic areas;
      defining a subset of cells from the plurality of cells for each subdomain;
      inverting each subset of raw data to form a physical property data subset for the respective subdomain;
      for each subdomain, assigning datum representing the physical property data subset to the subset of cells; and
      combining the physical property data subsets into the final data set of physical properties of the earth over the domain by a process, comprising:
         defining a quality statistic for each datum; and
         for each cell in the domain, identifying one or more subdomains for which that cell belongs in that subdomain's subset of cells, and computing a weighted average of the datum from the identified one or more subdomains using the quality statistic for each datum as a weighting factor.

2. The method of claim 1, wherein the quality statistic is selected from the group consisting of a sensitivity metric, an uncertainty metric, an error metric, a noise metric, a variance, and a combination thereof.

3. The method of claim 1, wherein the inverting each subset of raw data to form a physical property data subset comprises converging each inversion to a first convergence criterion, and further comprising performing an inversion process on the final data set using a second convergence criterion.

4. The method of claim 2, wherein the quality statistic is a variance, the inverting each subset of raw data includes computing an error between the subset and a model of the subset, and the variance is a variance of the error.

5. The method of claim 2, wherein the quality statistic is a variance and the variance is normalized by a sensitivity.

6. The method of claim 1, wherein the inverting each subset of raw data comprises repeatedly performing a process comprising:
   estimating physical property values;
   computing a model of the subset of raw data;
   comparing the model to the subset to determine an error; and
   computing a change to the estimated physical property values,
and wherein the quality statistic is an uncertainty metric based on the final change in estimated physical property values for each inversion process.

7. The method of claim 1, wherein the emitting energy toward an area of the earth comprises submerging an electric field emitter in water and powering the electric field emitter.

8. The method of claim 1, further comprising, for each cell, computing a variance of the data in the vector.

9. The method of claim 1, further comprising, for each cell, forming a vector from the identified physical property data subsets of the identified one or more subdomains.

10. The method of claim 1, wherein:
   a source emits the energy;
   a plurality of receivers distributed across a receiver array records the energy signature responses; and
   for each geographic area, boundaries are defined by at least one of:
      a distance of the geographic area from the source; and a distance of the geographic area from one or more of the receivers.

\* \* \* \* \*

UNITED STATES PATENT AND TRADEMARK OFFICE
CERTIFICATE OF CORRECTION

PATENT NO. : 10,346,278 B2  
APPLICATION NO. : 14/717761  
DATED : July 9, 2019  
INVENTOR(S) : Carl Joel Gustav Skogman and Lars Erik Magnus Björnemo It is certified that error appears in the above-identified patent and that said Letters Patent is hereby corrected as shown below:

In the Claims

At Column 12, Line numbers 56-60, please change the ordering and the dependency of Claims 8-9 to read as follows:
8. The method of claim 1, further comprising, for each cell, forming a vector from the identified physical property data subsets of the identified one or more subdomains.

9. The method of claim 8, further comprising, for each cell, computing a variance of the data in the vector.

Signed and Sealed this  
Fifth Day of November, 2019

Andrei Iancu  
*Director of the United States Patent and Trademark Office*